US006971675B2

(12) United States Patent
Dahmer

(10) Patent No.: US 6,971,675 B2
(45) Date of Patent: Dec. 6, 2005

(54) QUICK RELEASE STEERING WHEEL SYSTEM AND METHOD

(75) Inventor: Lee H. Dahmer, Round Hill, VA (US)

(73) Assignee: Sterling Replicars, Inc., Sterling, VA (US)

( * ) Notice: Subject to any disclaimer, the term of this patent is extended or adjusted under 35 U.S.C. 154(b) by 140 days.

(21) Appl. No.: 10/643,207

(22) Filed: Aug. 18, 2003

(65) Prior Publication Data
US 2004/0100143 A1 May 27, 2004

Related U.S. Application Data

(60) Provisional application No. 60/404,086, filed on Aug. 16, 2002.

(51) Int. Cl.$^7$ .............................. B62D 1/18; B62D 1/10
(52) U.S. Cl. ........................................ 280/775; 74/552
(58) Field of Search .............................. 280/775, 778, 280/779; 180/78, 287; 73/552

(56) References Cited

U.S. PATENT DOCUMENTS

| | | | | |
|---|---|---|---|---|
| 4,662,775 A | * | 5/1987 | Faul | 403/365 |
| 4,881,389 A | * | 11/1989 | Alfon et al. | 280/775 |
| 5,172,607 A | * | 12/1992 | Wu | 180/287 |
| 5,921,147 A | * | 7/1999 | Nagata et al. | 74/552 |
| 5,941,131 A | * | 8/1999 | Fohl | 74/552 |
| 6,314,833 B1 | * | 11/2001 | Pillsbury, IV | 74/552 |
| 6,802,193 B1 | * | 10/2004 | Long | 70/207 |
| 2002/0124681 A1 | * | 9/2002 | Hobaugh, II | 74/552 |

OTHER PUBLICATIONS www.globalautomotive.co.au, ad for GAP quick release steering boss adaptor, 2003.*
www.sromagazine.com, ad for NRG steering quick release kit, 2005.*
www.getnrg.com, product line for steering release kits, 2004.*

* cited by examiner

Primary Examiner—Russell D. Stormer
Assistant Examiner—Jason R. Bellinger
(74) Attorney, Agent, or Firm—Roberts Abokhair & Mardula LLC

(57) ABSTRACT

A quick release steering wheel system and method involves use of a billet hub adapter that has tapped holes for attachment of an OEM steering wheel that uses a non-standard bolt-pattern. The billet hub adapter includes an upper recess to provide space for the center cap of the OEM steering wheel and a lower recess for use of a commonly available, preferably pinless, quick release mechanism that is attached to the billet hub adapter via counter-sunk through-holes in the adapter. The adapter can be used to prevent theft of exotic automobiles as well as their exotic steering wheels. It can also be used to adapt the automobiles for use in racing environments that require quick release steering wheels for safety reasons, yet maintain a visually pleasing appearance when the OEM wheel is attached.

20 Claims, 6 Drawing Sheets

QUICK RELEASE STEERING WHEEL SYSTEM AND METHOD

RELATED APPLICATIONS

This application claims the benefit of Provisional Application Ser. No. 60/404,086, filed Aug. 16, 2002, and hereby incorporated by reference.

BACKGROUND OF THE INVENTION

The present invention is drawn to modifications to allow the use of available pinless quick release hubs for three-bolt steering wheels with more exotic 6-bolt and 9-bolt steering wheels, such as those available from Moto-Lita®.

In another embodiment, the present invention is drawn to providing a cosmetically pleasing pinless quick release for use with the OEM (Original Equipment Manufacturer) steering wheels of exotic cars such as the original AC & Shelby Cobra and replicas thereof.

The Cobra's OEM Moto-Lita steering wheel used a special Moto-Lita boss and was attached to an MGB splined steering shaft. To collectors and replica owners, the look of the wood trim steering wheel and its center cap are very important. However, there are numerous reasons why an owner of such a car would desire a quick release steering wheel.

For example, many racetracks and racing organizations require quick release steering wheels for safety purposes. A quick release wheel would also allow easy replacement of the wood trim wheel with a more suitable racing wheel when on the track.

The desirability and value of Cobras and their Moto-Lita steering wheels also make them the targets of thieves, especially since they are open cars that cannot be securely locked when outside of a garage. A removable wheel would help prevent steering wheel theft and drive-away theft of the automobile. And finally, a quick release wheel would be very convenient when performing work on the car to allow easier access to the dashboard, gauges, pedals, wiring, etc.

The problem with adding a quick release to such an exotic car is that most steering wheel quick releases are made for racing: they assume the use of a three-bolt steering wheel and are not designed with cosmetic considerations such that they tend to be cosmetically unacceptable to exotic car owners. Although a special, cosmetically acceptable quick release could be manufactured, it would be prohibitively expensive and economically impractical. The more practical solution, an adapter plate to allow use of the OEM Moto-Lita steering wheel, is still unacceptable since the steering shaft would be exposed and the center cap with the Cobra or AC logo could no longer be used.

BRIEF SUMMARY OF THE INVENTION

It is therefore an object of the present invention to provide a cosmetically pleasing quick release mechanism for use with the OEM steering wheels of exotic cars such as the original AC & Shelby Cobra and replicas thereof.

It is another object of the present invention to provide a quick release wheel for exotic cars for theft deterrence.

It is another object of the present invention to provide a quick release wheel for exotic cars for to comply with racing safety requirements.

It is a further object of the invention to allow convenient switching of a steering wheel on an exotic car from a cosmetically pleasing OEM-type steering wheel to a racing-type wheel and vice versa.

It is a final object of the invention to provide a quick release steering wheel to allow easier access to the dashboard and wheel well area during repairs and maintenance.

DETAILED DESCRIPTION OF THE INVENTION

Although disclosed with reference to an OEM Cobra steering wheel, the present invention has applicability to other automobiles with exotic steering wheels and center caps.

Figure 1:
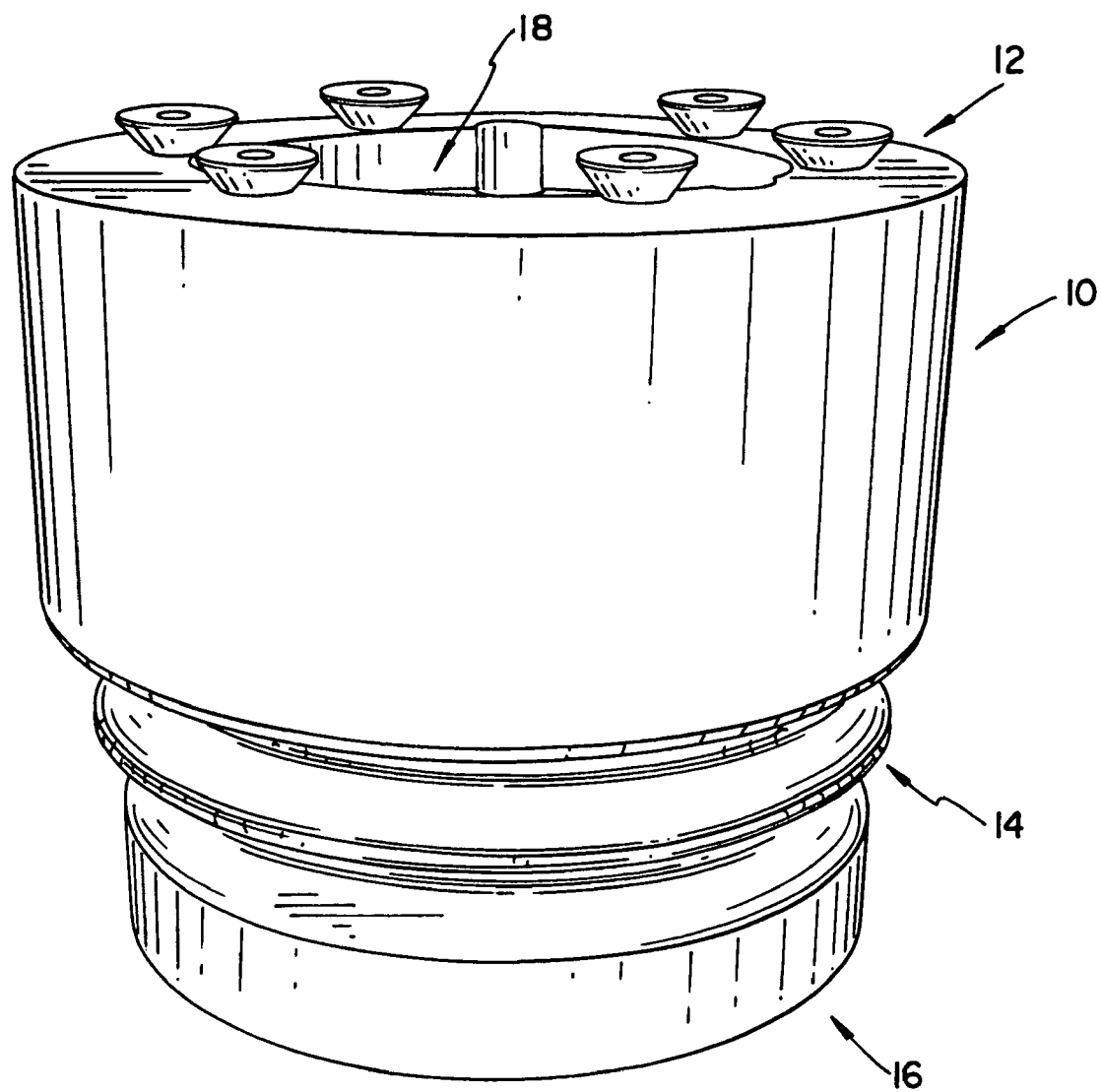
FIG. 1 illustrates a preferred embodiment of the present invention.

As is seen in FIG. 1, the major components of the present invention provide a cosmetically attractive steering wheel quick release assembly 10. In its preferred embodiment the assembly include a substantially cylindrical billet hub adapter 12, shown as a six-bolt Moto-Lita steering wheel adapter, a pinless quick release, shown with only the release flange 14 visible, and a "beauty ring" 16 piece of trim that is used to hide the steering shaft and integrate the assembly into the steering column/dashboard.

The billet hub adapter 12 is preferably formed of machined aluminum and can be left bare or anodized any preferred color (e.g., black). The beauty ring 16 is preferably machined from black Delrin® plastic (acetal resin) and can include set screws (not shown) to hold it in place.

Figure 2A:
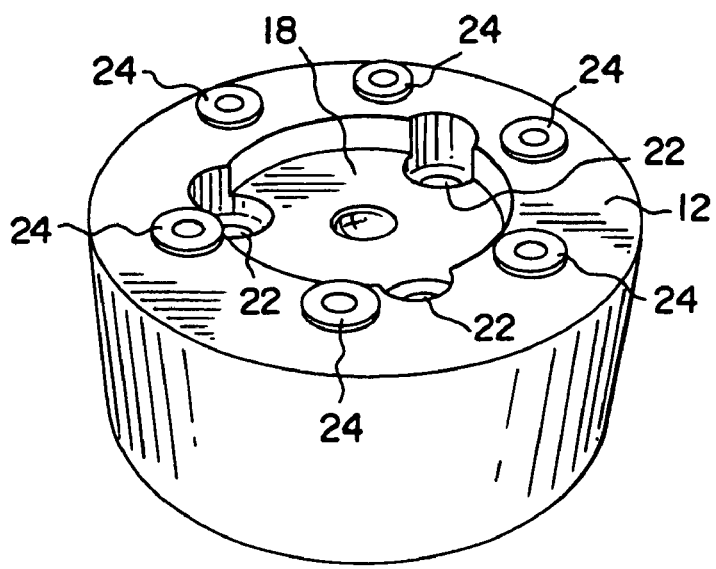
FIGS. 2A–2D illustrate the billet hub adapter of the present invention.
Figure 2B:
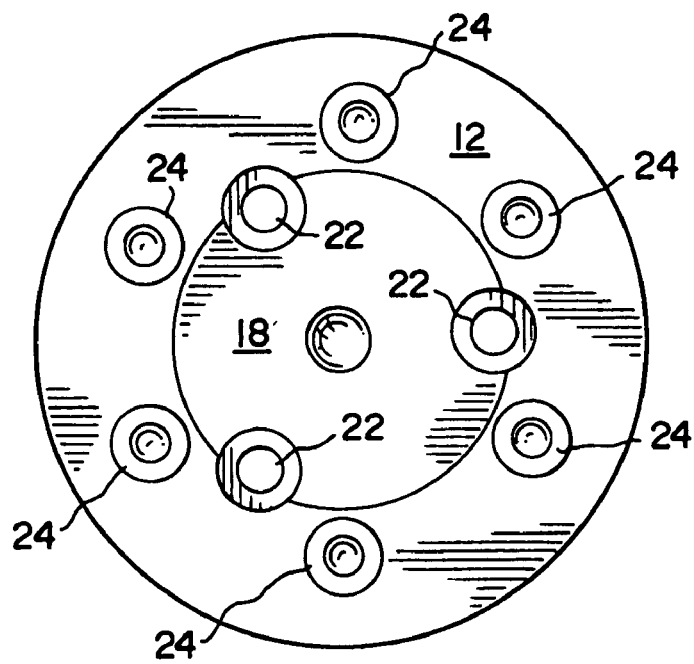

As shown in FIG. 1 and FIGS. 2A–2B, the top of the billet hub adapter 12 includes a central recess 18 to allow continued use of the OEM center cap. Within the recess are three through-holes 22 for the bolts used to secure the billet hub adapter 12 to a generally available three-bolt quick release mechanism. In a preferred embodiment, the holes 22 are counter-sunk for machine head bolts.

The top of the billet hub adapter 12 further includes tapped holes in the appropriate pattern for attaching the OEM steering wheel using bolts 24. A six-bolt Moto-Lita pattern is shown, although other patterns are possible. For example, the top of the billet hub adapter 12 could also be flared sufficiently to provide for a nine-bolt pattern (also used by Moto-Lita).

Figure 2C:
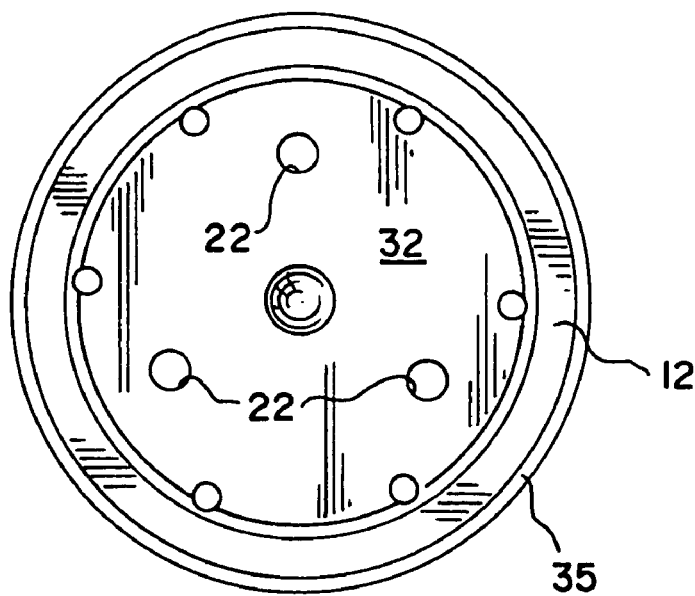
Figure 2D:
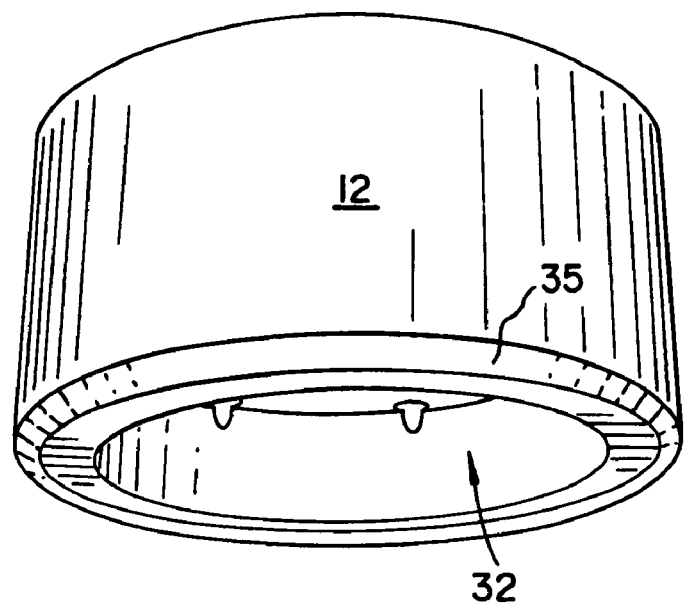

The bottom of the billet hub adapter 12 is illustrated in FIGS. 2C–2D and includes a central recess 32 sized to cover a top portion of the quick release. A beveled bottom edge 35 on the billet hub adapter 12 allows more clearance for accessing the flange of the quick release. The through-holes 22 extend into this recess 32 to allow secure attachment of the billet hub adapter 12 to the quick release. As shown in FIG. 2C, the through-holes 22 are positioned to match up with the threaded holes 38 in the top of the quick release 30 (shown in FIGS. 3C, 3D, and 4A).

Figure 3A:
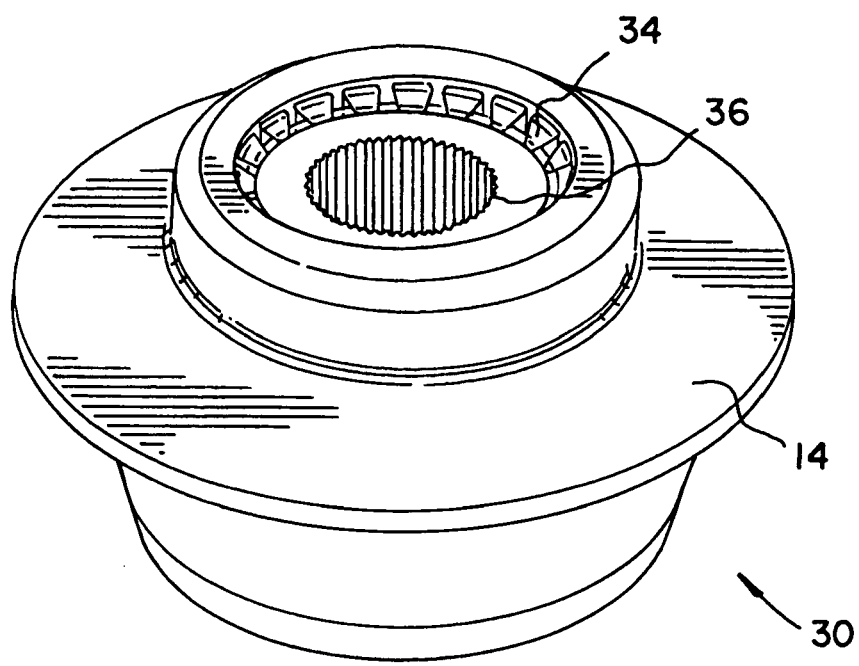
FIGS. 3A–3D illustrate a preferred pinless quick release used with the present invention.
Figure 3B:
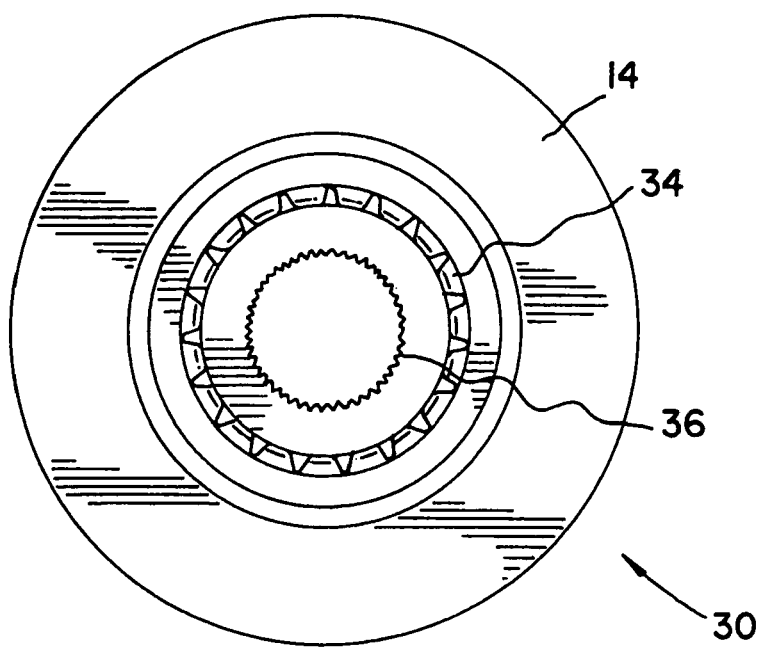

FIGS. 3A–3D illustrate the quick release mechanism 30 used in the present invention. In a preferred embodiment for Cobras, the quick release mechanism is a pinless unit available from Speedway Motors, Inc. of Lincoln Nebr. with a splined sleeve for attachment to the splined MGB steering shaft used in Cobras. As shown in FIGS. 3A–3B, the bottom of the quick release mechanism 30 has a splined hole 34 for engaging the splined sleeve 36. The interior of the sleeve 36 is splined to engage the steering shaft and the exterior of the sleeve 36 is splined to engage the splined hole 34 in the quick release. A central groove (not shown) is formed about the circumference of the sleeve 36 to engage ball bearings that extend from the splined hole 34. Pulling on the release flange 14 releases the ball bearings to allow the release of the quick release mechanism 30 (and thus the steering wheel) from the splined sleeve 36.

Figure 4A:
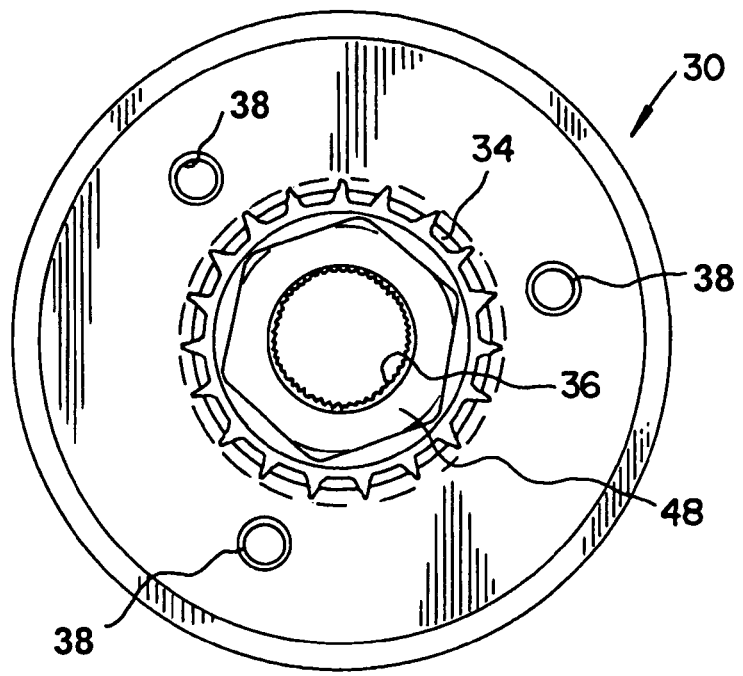
FIG. 4A illustrates the machined locknut of the present invention.

However, two modifications need to be made. First, the splined sleeve 36 should be shortened sufficiently to allow space for a lock nut 48 to fit within the interior of the quick release, and the nut 48, having an original outer diameter of 1¼", needs to be machined or replaced with one having a sufficiently small diameter, such as ⅞", to fit within the splined hole 34, as illustrated in FIG. 4A. This allows the original MGB steering shaft to remain unchanged to allow the steering to be returned to stock condition.

Figure 3C:
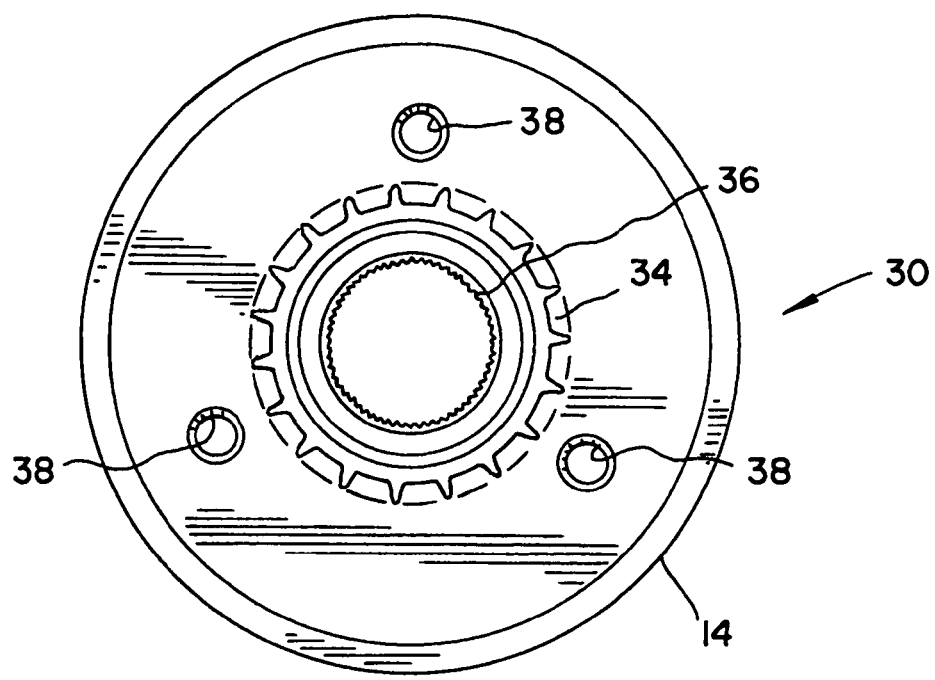
Figure 3D:
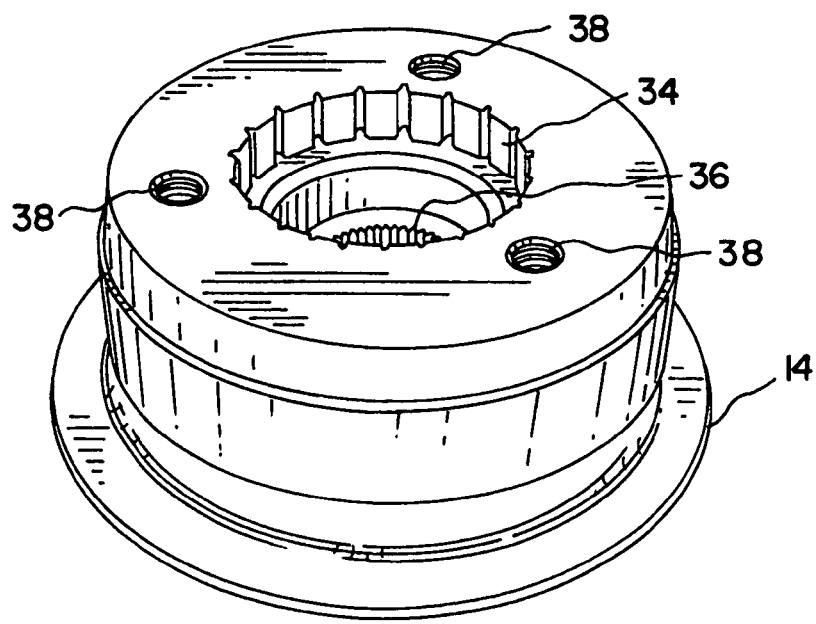
Figure 4B:
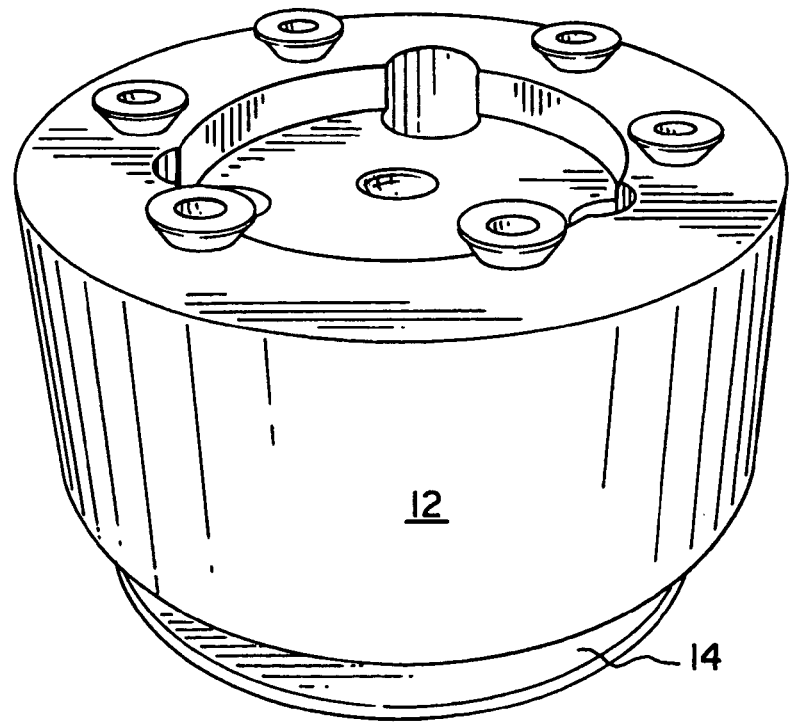
FIG. 4B illustrates the billet hub adapter positioned over the pinless quick release.

The top of the quick release mechanism 30, as shown in FIGS. 3C–3D, includes the three threaded holes 38 that are usually used to attach a three-bolt steering wheel, but in the present invention are used to attach the billet hub adapter 12. As shown in FIG. 4B, the billet hub adapter 12 covers a significant portion of the top of the quick release, leaving sufficient room for the operation of the release flange 14 of the quick release.

Although disclosed above with respect to a pinless quick release since it is the least intrusive design from a cosmetic viewpoint, one of ordinary skill in the art will understand that the invention is not so limited, and could use pinned or push-button release mechanisms as well with minor modification. Additionally, although disclosed with respect to a Cobra with a Moto-Lita/MGB steering set-up, the present invention is not so limited and one of ordinary skill in the art will recognize that it will have application to other similar set-ups, such as a Shelby Mustang with a Moto-Lita/Ford® set-up, Jaguar® (or any of a number of other British sports cars) with a Moto-Lita wheel, or a Ferarri® with a Nardi® wheel.

In the manner described above, a quick release can be provided to the steering wheel of an exotic automobile without any significant degradation of the cosmetic aspect of the automobile and its OEM steering wheel. The quick release wheel can add security and racing safety to the automobile without decreasing its appeal or value. Additionally, a second steering wheel can be outfitted with an identical quick release mechanism to allow simple and quick switching of steering wheels, such as for use on a racetrack.

I claim:

1. A billet hub adapter for a quick release steering wheel, comprising:
   a substantially cylindrical billet hub having a body, a top, and a bottom;
   a plurality of tapped holes in an OEM steering wheel bolt pattern on the top of the billet hub; and
   a first central recess in the bottom of the billet hub, the first central recess being dimensioned to cover a top portion of a suitable quick release mechanism for an OEM steering shaft and three-bolt steering wheels, the first recess including three through-holes in a pattern used by the quick release mechanism, the through-holes extending to the top of the billet hub.

2. The billet hub adapter of claim 1, further comprising:
   a second central recess in the top of the billet hub dimensioned to allow use of a center cap of the OEM steering wheel.

3. The billet hub adapter of claim 1, wherein the plurality of tapped holes are in a six-bolt pattern.

4. The billet hub adapter of claim 1, wherein the plurality of tapped holes are in a nine-bolt pattern.

5. The billet hub adapter of claim 1, wherein the through-holes are counter-sunk in the top of the billet hub.

6. The billet hub adapter of claim 1, further comprising:
   a beveled edge between the bottom and the body of the billet hub.

7. A quick release steering wheel system, comprising:
   a quick release mechanism for an OEM steering shaft for use with three-bolt steering wheels;
   a substantially cylindrical billet hub adapter having a body, a top, and a bottom;
   a plurality of tapped holes in an OEM steering wheel bolt pattern on the top of the billet hub adapter; and
   a first central recess in the bottom of the billet hub adapter, the first central recess being dimensioned to cover a top portion of the quick release mechanism, the first recess including three through-holes in a pattern used by the quick release mechanism, the through-holes extending to the top of the billet hub.

8. The quick release steering wheel system of claim 7, further comprising:
   a second central recess in the top of the billet hub adapter dimensioned to allow use of a center cap of the OEM steering wheel.

9. The quick release steering wheel system of claim 7, wherein the plurality of tapped holes are in a six-bolt pattern.

10. The quick release steering wheel system of claim 7, wherein the plurality of tapped holes are in a nine-bolt pattern.

11. The quick release steering wheel system of claim 7, wherein the through-holes are counter-sunk in the top of the billet hub.

12. The quick release steering wheel system of claim 7, further comprising:
    a beveled edge between the bottom and the body of the billet hub adapter.

13. The quick release steering wheel system of claim 8, further comprising:
    a flange release near a bottom portion of the quick release mechanism.

14. The quick release steering wheel system of claim 13, further comprising:
    a trim ring, the trim ring dimensioned to:
       attach to the bottom portion of the quick release mechanism below the flange release,
       hide the steering shaft, and
       visually integrate the system into a steering column and/or dashboard.

15. A method of preventing theft associated with exotic, open automobiles, comprising:
    attaching an OEM steering of the automobile using the quick release steering wheel system of claim 7, and
    removing the OEM steering wheel using the quick release steering wheel system when away from the automobile to discourage theft of the automobile or the OEM steering wheel.

16. A method of adapting exotic automobiles for use in racing environments that require a quick release steering wheel, comprising:

attaching an OEM steering of the automobile using a first quick release steering wheel system of claim 7.

17. A method of adapting exotic automobiles of claim 16, further comprising;
- attaching a three-bolt racing-type steering wheel to a second a quick release mechanism for the OEM steering shaft;
- removing the OEM steering wheel using the first quick release steering wheel system; and
- attaching the three-bolt type steering wheel using the second quick release mechanism when in the racing environment.

18. A method of preventing theft associated with exotic, open automobiles, comprising:
- attaching an OEM steering of the automobile using the quick release steering wheel system of claim 14, and
- removing the OEM steering wheel using the quick release steering wheel system when away from the automobile to discourage theft of the automobile or the OEM steering wheel.

19. A method of adapting exotic automobiles for use in racing environments that require a quick release steering wheel, comprising:
- attaching an OEM steering of the automobile using a first quick release steering wheel system of claim 14.

20. A method of adapting exotic automobiles of claim 19, further comprising;
- attaching a three-bolt racing-type steering wheel to a second a quick release mechanism for the OEM steering shaft;
- removing the OEM steering wheel using the first quick release steering wheel system; and
- attaching the three-bolt type steering wheel using the second quick release mechanism when in the racing environment.

* * * * *